United States Patent
Reimann et al.

(10) Patent No.: US 12,359,074 B2
(45) Date of Patent: Jul. 15, 2025

(54) SCUFF AND MAR RESISTANT COATING COMPOSITIONS

(71) Applicant: SWIMC LLC, Cleveland, OH (US)

(72) Inventors: Jay Reimann, Mentor, OH (US); Adriana Hemann, Strongsville, OH (US); Leo Lazaruk, Parma, OH (US); Angelo P. Mandato, Gates Mills, OH (US); Owen P. Kasson, Cleveland, OH (US)

(73) Assignee: SWIMC LLC

( * ) Notice: Subject to any disclaimer, the term of this patent is extended or adjusted under 35 U.S.C. 154(b) by 0 days.

(21) Appl. No.: 18/679,904

(22) Filed: May 31, 2024

(65) Prior Publication Data

US 2024/0400843 A1     Dec. 5, 2024

Related U.S. Application Data

(60) Provisional application No. 63/505,774, filed on Jun. 2, 2023.

(51) Int. Cl.
| | |
|---|---|
| *C09D 7/65* | (2018.01) |
| *C09D 7/40* | (2018.01) |
| *C09D 7/61* | (2018.01) |
| *C09D 109/08* | (2006.01) |

(52) U.S. Cl.
CPC ............... *C09D 7/65* (2018.01); *C09D 7/61* (2018.01); *C09D 7/70* (2018.01); *C09D 109/08* (2013.01)

(58) Field of Classification Search
CPC ............. C09D 7/61; C09D 7/65; C09D 7/70
See application file for complete search history.

(56) References Cited

U.S. PATENT DOCUMENTS

| | | |
|---|---|---|
| 4,025,483 A | 5/1977 | Ramig, Jr. |
| 7,381,415 B2 | 6/2008 | Yokoyama et al. |
| 10,676,580 B2 | 6/2020 | Beshah et al. |
| 10,865,276 B2 | 12/2020 | Bohling et al. |
| 10,913,867 B2 | 2/2021 | Bohling et al. |
| 11,505,715 B2 | 11/2022 | Guo et al. |
| 2002/0069790 A1 | 6/2002 | Hayashi et al. |
| 2016/0168409 A1 | 6/2016 | Booth et al. |
| 2018/0142103 A1 | 5/2018 | Beaudry et al. |
| 2019/0249015 A1 | 8/2019 | Fujimura et al. |
| 2022/0325124 A1 | 10/2022 | Bohling et al. |
| 2023/0159741 A1 | 5/2023 | Bohling et al. |
| 2023/0174817 A1 | 6/2023 | Eryazici et al. |

FOREIGN PATENT DOCUMENTS

| | | | | |
|---|---|---|---|---|
| EP | 2182033 A1 | * | 5/2010 | ............ C09D 5/028 |
| WO | WO-2011134907 A1 | * | 11/2011 | ............ C09D 5/028 |
| WO | 2017015006 A1 | | 1/2017 | |
| WO | 2017192982 A1 | | 11/2017 | |
| WO | 2020239634 A1 | | 12/2020 | |
| WO | 2022192377 A1 | | 9/2022 | |
| WO | 2022203764 A1 | | 9/2022 | |

OTHER PUBLICATIONS

International Search Report and Written Opinion (USPTO) for Application PCT/US2024/031931 dated Aug. 28, 2024.

\* cited by examiner

*Primary Examiner* — Vu A Nguyen
(74) *Attorney, Agent, or Firm* — Honigman LLP

(57) ABSTRACT

Coating compositions and extender packages for coating compositions that include first polymeric or inorganic extender particles, second polymeric or inorganic extender particles, and a polysiloxane dispersible in water. Both the first and second extender particles are relatively hard and have a narrow particle size distribution.

21 Claims, No Drawings

SCUFF AND MAR RESISTANT COATING COMPOSITIONS

CROSS REFERENCE TO RELATED APPLICATION

This application claims priority under 35 U.S.C 119(e) to U.S. Provisional Application No. 63/505,774 filed on Jun. 2, 2023. The entire contents of the aforementioned application is incorporated herein.

FIELD OF THE INVENTION

This invention pertains to architectural coatings such as paints and stains that provide increased scuff and mar resistance.

BACKGROUND

Architectural coatings such as paints and stains are subject to wear over their lifetime, particularly in heavily used areas of homes, offices, and other buildings. Consequently, coating durability and resistance to wear is a desirable characteristic. Scratches or scuffs occurring by, for example, contact with people or objects such as furniture, shoes, and boxes, may be expected in areas of heavy use. Scratches and scuffs in some instances may leave an undesirable visible mark on the coated surface.

In some applications, the bulk of a coating's resistance to scratches and scuffs is provided by the film-forming binder present in the coating composition from which the coating is derived, such as a polyurethane or poly(meth)acrylate latex polymer. In some applications, inorganic mineral extenders such as calcium carbonate and silica are added to the coating composition as fillers or functional additives. For instance, deep and ultra deep base coating compositions contain little to no titanium dioxide. There, inorganic mineral extenders serve as fillers. In non-glossy coatings like flat and matte sheens, inorganic mineral extenders also can be incorporated to scatter specular reflectance, resulting in a less glossy, flat or matte appearance when applied to a surface.

However, conventional inorganic mineral extenders have an irregular shape which can include sharp and jagged edges. Consequently, when high amounts of inorganic mineral extenders are present, they can impart a comparatively rough surface to the coating, making the coating more susceptible to scratch and mar damage occurring when incident objects dislodge mineral extenders on the coating surface. Non-gloss coatings, such as those having a flat or matte finish, and deep and ultra deep base coatings are particularly susceptible to scratch and mar damage, because such coatings have a greater proportion of inorganic mineral extenders relative to polymer than other coatings.

Paints and coating compositions, however, are complex formulations, and different additives can interact to have unpredictable, favorable, or unfavorable impacts on the various properties of the paint or coating. In formulating a paint or coating, the addition to or modification of a paint or coating composition formula with different additives or other components must be carefully balanced such that important properties of the paint or coating, such as washability, scrub resistance, heat and age stability, and microbial preservation, to name only a few, are maintained, improved, or subject to only minimal, tolerable decreases in quality.

Thus, there is a need for coating compositions that provide improved scratch and mar resistance without adversely impacting other coating properties, particularly in compositions that require high amounts of fillers and extenders such as deep and ultra deep paint compositions.

SUMMARY OF THE INVENTION

Disclosed herein are coating compositions that provide improved scuff and mar resistance.

In one embodiment, the coating composition is aqueous and comprises a water-based carrier liquid; optionally, 30 weight percent or less of at least one opacifying pigment based on the total weight of components of the coating composition; first round polymeric or inorganic extender particles lacking sharp edges and points and having an aspect ratio of 1:1 to 3:1, a $D_{50}$ of 2 microns to 8 microns and a particle size span $((D_{90}-D_{10})/D_{50})$ of less than 2 as measured by laser diffraction particle size analysis, and, if inorganic, a Mohs hardness of at least 2 and, if polymeric, a Shore D hardness of at least 75; second round polymeric or inorganic extender particles lacking in sharp edges and points, having an aspect ratio of 1:1 to 3:1, a $D_{50}$ of 8 microns to 30 microns, and a particle size span $((D_{90}-D_{10})/D_{50})$ of less than 2.5, wherein as measured by laser diffraction particle size analysis, and, if inorganic, a Mohs hardness of at least 2 and, if polymeric, a Shore D hardness of at least 75; and a polysiloxane dispersable in water.

The coating composition may be combined with one or more optional aspects as disclosed herein, alone or in combination: wherein the film-forming binder comprises a (meth)acrylic latex, a styrene-acrylic latex, a vinyl acetate latex, a urethane modified acrylic latex, or combinations thereof; and/or a polyurethane dispersion; wherein the opacifying pigment is present and comprises titanium dioxide; wherein the polysiloxane dispersible in water is selected from polydimethylsiloxane (PDMS) emulsions and/or polydiethylsiloxane (PDES) emulsions; wherein the first extender particles have the same composition as the second extender particles; wherein the first extender particles or both comprise ceramic; wherein the first extender particles or the second extender particles or both include an aluminosilicate; wherein the first extender particles, the second extender particles, or preferably both, are essentially spherical; wherein the carrier is at least 50 wt. % water, preferably at least 70 wt. %, at least 90 wt. %, or at least 95 wt. %, or most preferably at least 99 wt. % water based on the weight of the carrier, and wherein the carrier optionally further includes a solvent selected from aliphatic, cycloaliphatic and aromatic hydrocarbons such as white spirit, cyclohexane, toluene, xylene and naphtha solvents, esters such as methoxypropyl acetate, n-butyl acetate and 2-ethoxyethyl acetate, or octamethyltrisiloxane, and mixtures thereof.

Continuing, the coating compositions may be combined with one or more of the following aspects, alone or in combination: wherein the first extender particles are present in the coating composition in an amount of at least 10 lb/100 gallons (4.54 kg/378.5 liters) wet coating composition based on the total components of the coating composition; wherein the first extender particles are present in the coating composition in an amount of at most 125 lb/100 gallons (56.70 kg/378.5 liters) wet coating composition based on the total components of the coating composition; wherein the first extender particles are present in the aqueous coating composition in an amount of at least 2 wt. %, preferably at least 4 wt. %, preferably at least 6 wt. %, most preferably at least 8 wt. %, based on the total weight of components in the aqueous coating composition; wherein the first extender particles are present in the aqueous coating composition in an amount of at most 12 wt. %, preferably at most 10 wt. %, more preferably at most 9 wt. %, based on the total weight of components in the aqueous coating composition; wherein the second extender particles are present in the coating composition in an amount of at most 120 lb/100 gallons wet coating composition; wherein the second extender particles are present in the aqueous coating composition in an amount of at least 0.25 wt. %, preferably at least 1.0 wt. %, more preferably at least 2 wt. %, most preferably at least 5 wt. %, based on the total weight of components in the aqueous coating composition; wherein the second extender particles are present in the aqueous coating composition in an amount of at most 10 wt. %, preferably at most 8 wt. %, more preferably at most 6 wt. %, based on the total weight of components in the aqueous coating composition.

Continuing, the coating compositions may be combined with one or more of the following aspects, alone or in combination: wherein the first extender particles or the second extender particles or both have a Mohs scale hardness of at least 5; wherein the polysiloxane is present in the aqueous coating composition in an amount of at least 0.5 lb per 100 (0.23 kg per 178.5 liters) gallons of coating composition; wherein the polysiloxane is present in the aqueous coating composition in an amount of at most 25 lb per 100 gallons (11.34 kg per 178.5 liters) of coating composition; wherein when applied to a substrate by drawdown with a 4 mil (0.10 mm) Bird bar and allowed to cure for about 10 minutes at room temperature then 30 minutes at 50° C., the cured coating has a 60° gloss of less than about 5 and an 85° sheen of less than about 5 as measured by ASTM D523; wherein when applied to a substrate by drawdown with a 4 mil (0.10 mm) Bird bar and allowed to cure for about 10 minutes at room temperature then 30 minutes at 50° C., the cured coating has a 60 Gloss of less than about 10 or an 85 Sheen of less than about 10 as measured by ASTM D523; wherein when applied to a substrate by drawdown with a 4 mil (0.10 mm) Bird bar and allowed to cure for about 10 minutes at room temperature then 30 minutes at 50° C., the cured coating has an 85 Sheen of less than about 25 as measured by ASTM $D_{523}$; wherein when applied to a substrate by drawdown with a 4 mil (0.10 mm) Bird bar and allowed to cure for about 10 minutes at room temperature then 30 minutes at 50° C., the cured coating has an 85° sheen of between 25 and 45 as measured by ASTM D523; or wherein when applied to a substrate by drawdown with a 4 mil (0.10 mm) Bird bar and allowed for about 10 minutes at room temperature then 30 minutes at 50° C., the cured coating has an 85° gloss of greater than 45 as measured by ASTM D523.

The above summary of the present disclosure is not intended to describe each disclosed embodiment or every implementation of the present disclosure. The description that follows more particularly exemplifies illustrative embodiments. In several places throughout the disclosure, guidance is provided through lists of examples, which examples may be used in various combinations. In each instance, the recited list serves only as a representative group and should not be interpreted as an exclusive or exhaustive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION

The present disclosure relates to coating compositions and coatings and coated substrates produced therefrom, which provide desirable and advantageous improvements in scuff and mar resistance over current coating compositions. Coating compositions of the present disclosure are particularly useful in Coating compositions of the present inventions include architectural paints and stains such as those for application on wood, drywall, masonry, concrete, metal, and plastic. The present disclosure also provides an extender package which, upon incorporation in a coating composition, provides improved scuff and mar resistance.

First and Second Inorganic or Polymeric Extender Particles

The first and second extender particles are each a matting or extender agent. As further described herein, the both the first and second extender particles each have a relatively narrow particle size distribution and are relatively hard inorganic or polymeric particles. In coating compositions of the present disclosure, the second extender particles are larger than the first extender particles. It has surprisingly been discovered that extender particles having a broad particle size distribution, and/or have too soft of a morphology, provide inferior scuff resistance.

The first and second extender particles of the present disclosure may independently be inorganic or polymeric. If polymeric, the first or second extender particles may independently comprise a polyalkyl (meth)acrylate, like polymethyl methacrylate, or a polyethylene such as high density polyethylene or low density polyethylene, or polypropylene, or a polyamide, a polyimideamide, a polytetrafluoroethylene, a poly vinyl acetate, a poly vinyl chloride, polystyrene, a butyl styrene polymer, or a polyurethane. The first or second extender particles may independently be solid, hollow, multi-layered, coated, or composite. Unlike polymeric binders present in a coating composition, the first and second extender particles of the present composition, retain discrete polymeric identity when the coating composition is cured.

If inorganic, the first extender particles and the second extender particles may independently be ceramic, glass, or preferably an alkali aluminosilicate such as sodium aluminosilicate or potassium aluminosilicate. Suitable inorganic extender particles may include Ceramic Microspheres from 3M Corp.; or ZCel® Microspheres from Potters Industries LLC. To yield the relatively narrow particle size span of the present disclosure, inorganic extender particles may be milled or ground to an appropriate size, then passed through one or more sieves to yield a desired particle size distribution.

The first and second extender particles are each a relatively hard material. Without being bound by theory, it is believed that inclusion of relatively hard extender particles provides improved scratch resistance compared to softer extender particles. If polymeric, then the first extender particle or the second extender particle each independently have a Shore D hardness of at least 75. Thus, if polymeric, the first or second extender particles are a relatively hard polymer. If inorganic, the first or second extender particles have a Mohs scale hardness of at least 2. In some approaches, the first extender particles or the second extender particles of the present disclosure, or both, have a Mohs scale hardness of at least 5.

In some embodiments, the first extender particles, the second extender particles, or both, have a uniform composition throughout the particle, meaning that the particle is not a composite or layered particle.

In some embodiments, the first extender particles have the same material composition as the second extender particles.

The first and second extender particles are generally round in shape, having a curved surface. In contrast to convention, mined inorganic extenders, the first and second extender particles lack sharp edges and points. While not wishing to be bound by theory, it is further believed that the round shape of the first and second extender particles and lack of sharp edges or points results in less scuff resistance because the extender particles do not catch on incident objects. The round particles of the present disclosure thus contrast with non-spherical particles such as micronized particles, acicular particles, or flake-like particles. Inorganic mined extenders such as Minex, for example, may include such irregular shapes and sharp points. For instance, the polymeric particles herein, when viewed under an electron microscope, tend to have an about spherical, round, or ball-like shape. However, the specific shape of the first and second extender particles is not limited to spherical or ball-shaped extenders. Thus, the first polymeric or inorganic extender and the second polymeric or inorganic extender each are spherical or essentially spherical, but in some approaches, may independently be, for example, ovoid, egg-shaped, or hemispherical or cup shaped. Although the specific shape of the first extender and second extender in some embodiments is not limited beyond having a uniform cross-section, this is in contrast to some inorganic mineral extenders that have highly irregular shapes, flattened shapes, or jagged edges, like some inorganic mineral extenders sourced from mines. Thus, the first extender and second extenders lack an irregular shape, a flattened shape, sharp edges and/or sharp points. While not wishing to be bound by theory, it is believed that inclusion of extender particles having this shape morphology provides improved mar and scuff resistance relative to ordinary, mined extenders because ordinary extenders may have jagged, rough edges that can snag an incident object, resulting in a scratch on the surface of the coating. In contrast, the combination of two extender particles as in the present disclosure results in a coating surface that is relatively smooth and free of edges that could snag.

In some approaches, the first or second extender particles, or both, may have an aspect ratio (that is, particle length to particle width) of about 1:1 to about 3:1, preferably about 1:1 to about 2:1, more preferably about 1:1 to about 1.5:1, and most preferably about 1:1.

To achieve the relatively round shape, the first or second extender particles may be formed by polymerization of the particle around a seed, or grinding milling of inorganic particle to yield a relatively round particle, followed by passage of particles through a series of sieves to achieve a narrow particle-size distribution. The relatively round shape may also be achieved by any suitable manufacturing method sufficient to provide a relatively round extender particle.

Suitable polymeric extenders may include Ceraflour® 913, Ceraflour® 914, Ceraflour® 915, Ceraflour® 916, Ceraflour® 917, Ceraflour® 920, Ceraflour® 920, Ceraflour® 921, Ceraflour® 925N, Ceraflour® 927N, Ceraflour® 929N, Ceraflour® 999, Ceraflour® 1000, Ceraflour® 1001, Ceraflour® 1002, Ceraflour® 1050, Ceraflour® 1051, or Ceraflour® 1052 from Byk Corporation; Ceridust® 3715, Ceridust® 3620, Ceridust® 8020, Ceridust® 3920F, Ceridust® 9322 F TP, Ceridust® 9610 F, Ceridust® 2740 TP, or Ceridust® 3910 from Clariant Corp.; Biomer 110M, Biomer 130M, Biomer 140M, Biomer 60M, Biomer 88M, Biomer 110C, Biomer 130C from Duerex® AG; Duerex® A 2015M, Duerex® A 2050M, Duerex® A 2625M, Duerex® A 2830M, Duerex® E 0915M, Duerex® E 0925M, Duerex® EO 4515M, Duerex® EO 4520M, Duerex® EO 4530M, Duerex® EO 4545M, Duerex® EO 4560M, Duerex® H 7320M, Duerex® H9122M, Duerex® H 9415M, Duerex® H 9515M, Duerex® H 9620M, Duerex® H 3620M, Duerex® P 3620M, Duerex® P 3815M, Duerex® P 3820M, Duerex® T 3915M, Duerex® P 3920M, Duerex® P 3925M, Duerex® T 4911M, Duerex® T 4915M, Duerex® TO 8120M, Duerex® X 2010M, Duerex® X 5217M, or Duerex® X 5520M, from Duerex® AG; Chemisnow MX-300, or Chemisnow MX-500 from Kowa American Corporation; Vestolit® PVC polymers from Mexichem Specialty Resins, Inc.; Sphereomers© CA beads from Microbeads AS; the Lanco™ line of wax and polymeric coatings from Lubrizol Corp.; polypropylene, HDPE, and PTFE extenders available from MicroPowders Inc.; Ceratan™ extenders from Munzing Chemie; PMMA and PTFE extenders from Shamrock Technologies; silicone powders from ShinEtsu Chemical Co., and polyurethane and other polymeric beads from Lamberti S.p.A. In some approaches, the first extender particles and the second extender particles include no intentionally added crystalline silica.

The first and second extender particles of the present disclosure also have a relatively narrow particle size distribution about the median particle diameter. The first and second extender particles of the present disclosure, specifically, have a narrow particle size span defined to mean $(D_{90}-D_{10})/D_{50}$. The particle size span of the first extender particles is less than 2, and the particle size span of the second extender particles is less than 2.5. Thus, the particle size distribution of each of the first and second extenders is narrowly concentrated around the median particle diameter. In some embodiments, the first or second extender particles, or both, are polymeric and monodisperse. In some approaches, the particle size coefficient of variation of the first extender particles, the second extender particles, or both, is about 40 percent or less, about 30 percent or less, about 20 percent or less, about 15 percent or less, about 10 percent or less, or about 5 percent or less.

The first and second extender particles of the present disclosure are differently sized. More specifically, the median size of the first extender particles is smaller than the median size of the second extender particles. The first extender particles have a median particle size ($D_{50}$) of 2 to 8 microns. The second extender particles have a median particle size ($D_{50}$) of 8 microns to 20 microns. In some approaches of the disclosed coating compositions, the median particle size of the second extender particles is at least 1.3×, at least 1.5×, at least 2×, or at least 3× the median size of the first extender particles.

While not wishing to be bound by theory, it is believed that the combination of larger (second) extender particles, and a smaller (first) extender particles both extender particles having a relatively narrow particle size distribution, results in a coating composition that, when applied and cured, has a interstitial matrix of larger extender particles and smaller extender particles on the coating surface. Without being bound by theory, it is believed that the combination of a larger extender particle and a smaller extender particle results in a coating surface that is relatively smooth, thus lacking a jagged surface that could result in a visible scratch or mar when abraded.

In some approaches, the first extender particles are present in the coating composition in an amount of at least about 10 lb (4.54 kg), at least about 20 lb (9.08 kg), at least about 25 lb (11.35 kg), or at least about 60 lb (27.24 kg)/100 gallons (378.5 L) wet coating composition based on the total components of the coating composition. In some approaches, the first extender particles are present in an amount of at most 125 lb (567.5 kg), at most 100 (45.4 kg), or at most 75 lb (34.05 kg)/100 gallons (378.5 L) wet coating composition based on the total components of the coating composition. As a weight percentage, in some approaches, the first extender particles are present in the aqueous coating composition in an amount of at least 2, at least 4, at least 6, or at least 8 wt. % based on the total weight of components in the aqueous coating composition. In some approaches, the first extender particles are present in the aqueous coating composition in an amount of at most 12, at most 10, or at most 9 wt. % based on the total weight of components in the aqueous coating composition.

In some approaches, the second extender particles are present in the coating composition in an amount of at least about 5 lb (2.27 kg), at least about 25 (11.35 kg), or at least about 50 lb (22.7 kg)/100 gallons (378.5 L) wet coating composition. In some approaches, the second extender particles are present in the coating composition in an amount of at least most 120 lb (54.48 kg), at most 100 (45.4 kg), or at most 75 lb (34.05 kg)/100 gallons (378.5 L) wet coating composition.

As a weight percent, in some approaches, the second extender particles of the aqueous coating composition are present in the coating composition in an amount of at least about 0.25, 1.0, 2, 5, or 8 wt. % based on the total weight of components in the coating composition. In some approaches, the second extender particles are present in the aqueous coating composition in an amount of at most about 10, 8, or 6 wt. % based on the total weight of components in the coating composition.

In some approaches, the ratio of the weight of first extender particles to second extender particles present in the coating composition is at least about 1 to 1, at least about 3 to 1, at least about 5 to 1, or at least about 7 to 1.

Extender Package

The present disclose provides for an extender package suitable for addition to a coating composition, the extender package comprising the first extender particles and second extender particles of the present disclosure. The ratio in amount of the first and second extender particles in the extender package, and the amount of the extender package to be added to a coating composition, is determined such that the coating composition, upon mixing, will include desired amounts of the first extender particles and second extender particles.

Coating Composition Components

In addition to the first and second and extender particles, coating compositions of the present disclosure include a water-based carrier, polysiloxane dispersible in water, at least one opacifying pigment, and a film-forming binder.

Water-Based Carrier Liquid

Compositions of the present disclosure are aqueous, in that they include a water-based carrier liquid. The carrier liquid is water-based (>50 wt. % water in the carrier liquid system), and preferably may be at least 70 wt. %, at least 90 wt. %, or at least 95 wt. % of at least 99 wt. % water. Optionally, the carrier liquid may further include a solvent selected from aliphatic, cycloaliphatic and aromatic hydrocarbons such as white spirit, cyclohexane, toluene, xylene and naphtha solvent, esters such as methoxypropyl acetate, n-butyl acetate and 2-ethoxyethyl acetate; octamethyltrisiloxane, or other solvents used in solvent borne systems and mixtures thereof. Carrier liquids may also include recycled liquid from manufacturing of paints, adhesives, sealants, stains, caulks, and mineral and pigment slurries. Compositions of the present disclosure may include one or more carrier liquids. In some approaches, the carrier liquid or liquids are selected so as to provide an aqueous composition that is low VOC, very low VOC, extremely low VOC, or zero VOC.

In some embodiments, carrier liquids may constitute 5-60% by volume of a coating composition. In some embodiments, carrier liquids may constitute 40-60% of an aqueous polymeric binder composition.

Polysiloxane Dispersible in Water

The coating composition also includes a polysiloxane dispersible in water. Suitable polysiloxane emulsions or dispersions include, but are not limited to, polydimethylsiloxane (PDMS) emulsions, polydiethylsiloxane (PDES) emulsions and the like that are readily dispersible in water. In some approaches, the polysiloxane dispersions or emulsions may include hydroxy-terminated polydimethylsiloxane, ethoxylated C11 to C15 secondary alcohols, and glycol-modified trimethylated silica. The hydroxyl-terminated polydimethylsiloxane may be present in the emulsion or dispersion in the form of spherical droplets having a Dv50 equal to or less than 10 microns, as measured by laser diffraction. In some approaches, the polysiloxane dispersions may have a solids content of about 45% to about 85% of the polydimethylsiloxane and a viscosity of about 1,000 cP to 10,000 cP, or about 2,000 to about 8,000 cP, or about 3,000 to about 5,000 cP. When combined with the extender particles in certain relationships, the combination aids in achieving the dual benefits of scuff and scratch resistance of the direct coatings. While not wishing to be bound by theory, it is believed that inclusion of the polysiloxane additive reduces the coating surface coefficient of friction, thereby reducing the likelihood that an incident object will deface the coating surface.

In some approaches, the polysiloxane is present in the coating composition in an amount of at least about 0.5 lb (0.227 kg), at least about 1 lb (0.454 kg), at least about 5 lb (2.27 kg), at least about 10 lb (4.54 kg), or at least about 15 lb (6.81 kg) per 100 gallons (378.5 L) of coating composition. In some approaches, the polysiloxane is present in the coating composition in an amount of at most about 25 lb (11.35 kg), or at most about 20 lb (9.08 kg) per 100 gallons (378.5 L) of coating composition. Suitable polysiloxane dispersions may include Dowsil™ 14, Dowsil™ 18, Dowsil™ 27, Dowsil™ 29, Dowsil™ 51, Dowsil™ 52, Dowsil™ 54, Dowsil™ 55, Dowsil™ 205SL, Dowsil™ 210S, Dowsil™ 511S, Dowsil™ 62, Dowsil™ 68, Dowsil™ 106F, and Dowsil™ 108F, from The Dow Chemical Company; or polysiloxane emulsions available from Wacker Chemie AG.

Film-Forming Binder

The coating compositions herein also include at least one film-forming binder or film-forming binder resin. The binder is of a type and present in an amount that is film-forming, meaning that upon application to the substrate and drying, the coating composition will coalesce and form a continuous film over the applied substrate. Types of film-forming binders include one or more of a (meth)acrylic latex, a styrene-acrylic latex, a urethane-modified acrylic latex, a vinyl acetate latex, a polyurethane dispersion, or combinations thereof.

Suitable monomers therefor include ethylenically unsaturated monomers having carboxylic acid, alkyl acrylate, alkyl methacrylate, or acetate moieties. The copolymer may include as polymerized units in a polymer backbone vinyl monomers and acrylic monomers such as at least vinyl acetate, alkyl acrylate, alkyl methacrylate, acrylic, styrene acrylic, and combinations thereof. Alkyl groups of the monomers may have linear or branched chain lengths from C1 to C8 and, in some approaches, are ethyl, propyl, isopropyl, butyl, ethyl hexyl, and the like side groups.

In some approaches, vinyl monomers are selected from the group consisting of vinyl esters, vinyl aromatic hydrocarbons, vinyl aliphatic hydrocarbons, vinyl alkyl ethers and mixtures thereof. Examples of vinyl esters that may be used include vinyl acetate, vinyl propionate, vinyl laurate, vinyl pivalate, vinyl nonanoate, vinyl decanoate, vinyl neodecanoate, vinyl butyrates, vinyl benzoates, and vinyl isopropyl acetates. Examples of vinyl aromatic hydrocarbons that may be used include styrene, methyl styrenes and other lower alkyl styrenes, chlorostyrene, vinyl toluene, vinyl naphthalene and divinyl benzene. Examples of vinyl aliphatic hydrocarbons that may be used include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene. Examples of vinyl alkyl ethers that may be used include methyl vinyl ether, isopropyl vinyl ether, n-butyl vinyl ether, and isobutyl vinyl ether.

Acrylic monomers suitable for polymerization in the binder are any compounds having acrylic or methacrylic functionality. Suitable acrylic monomers are selected from the group consisting of alkyl (meth)acrylates, acrylic acids, as well as aromatic derivatives of (meth)acrylic acid, acrylamides, acrylonitrile, or combinations thereof. Typically, the alkyl (meth)acrylate monomers (also referred to herein as "alkyl esters of (meth)acrylic acid") will have an alkyl ester portion containing from 1 to 12, in some approaches, about 1 to 8, in yet other approaches, about 1 to 6, and in yet further approaches, 1 to 4, carbon atoms per molecule.

Suitable acrylic monomers may include, for example, methyl (meth)acrylate, ethyl (meth)acrylate, butyl (meth) acrylate, propyl (meth)acrylate, 2-ethyl hexyl(meth)acrylate, cyclohexyl (meth)acrylate, decyl(meth)acrylate, isodecyl(meth)acrylate, benzyl (meth)acrylate, isobornyl (meth)acrylate, neopentyl (meth)acrylate, 1-adamantyl methacrylate and various reaction products such as butyl, phenyl, and cresyl glycidyl ethers reacted with (meth)acrylic acid, hydroxyl alkyl (meth)acrylates, such as hydroxyethyl and hydroxypropyl (meth)acrylates, amino (meth)acrylates, as well as acrylic acids such as (meth)acrylic acid, ethacrylic acid, alpha-chloroacrylic acid, alpha-cyanoacrylic acid, crotonic acid, beta-acryloxy propionic acid, and beta-styryl acrylic acid.

In some approaches, the acrylic polymer of the film forming binder may include substantial amounts of interpolymerized vinyl acetate monomer. The acrylic copolymer may also include about 90 to about 100 weight percent of linear or branched alkyl acrylate or alkyl methacrylate monomer, and in other approaches, about 94 to about 100 weight percent of a linear or branched alkyl acrylate or alkyl methacrylate monomer. In some approaches, the copolymer may further include substantial amounts of interpolymerized acrylic acid monomer.

The film-forming binder may also include optional interpolymerized ketone-functional vinyl monomer units. In some approaches, these monomer units may be derived from diacetone acrylamide, diacetone (meth)acrylamide, acetoacetoxyethyl (meth)acrylate, acrolein, methacrolein, vinylacetoacetate, crotonaldehyde, 4-vinylbenzaldehyde, vinyl alkyl ketones, acrylamide-pivalaldehyde, methacrylamidopivalaldehyde, 3-acryl amidomethyl-anisaldehyde, diacetone acrylate, acetonyl acrylate, diacetone methacrylate, acetoacetoxyethylmethacrylate, 2-hydroxypropylacrylate acetylacetate, and butanediolacrylate acetylacetate and the like, and combinations thereof.

In some approaches, the film-forming binder may be interpolymerized from about 0 to about 20 weight percent of the optional ketone-functional monomer units, and in other approaches, about 0 to about 12 weight percent, and in yet other approaches, about 1 to about 16 weight percent or 2 to about 12 weight percent as a percentage of the acrylic phase.

The film-forming binder resins herein may also include other optional monomers interpolymerized into the polymer backbone as needed for a particular application. For instance, the copolymer may further include ureido monomers, amino monomers, sulfonate monomers or surfactants, silane monomers, phosphate monomers or surfactants, carboxyl monomers or surfactants, and combinations thereof. In some approaches, the copolymer may further include interpolymerized vinyl monomers such as allyl imidazolidinone, allyl acetoacetates, allyl epoxies, epoxy acrylates, carbonyl monomers, other sulfonates, other phosphonates, vinyl phosphonate, allyl hydroxypropyl sodium sulfonate, allyloxy hydroxypropyl sodium sulfonate, and combinations thereof as needed for a particular application. In some approaches, for instance, the other optional monomers may each be interpolymerized in the acrylic copolymer in amounts up to about 10 weight percent, and in other approaches, about 0.1 to about 5 weight percent, in other approaches, about 0.5 to about 2 weight percent of the total monomers interpolymerized in the copolymer, but the amounts may vary depending on the particular application. In other approaches, the other or additional monomers may each be interpolymerized in the polymer backbone in amounts less than about 1 weight percent.

The coating compositions herein, in some approaches, may include at least 150 lbs (68.1 kg) of film-forming binder solids to about 275 (124.85) lbs film-forming binder solids per 100 gallons (378.5 L) of coating composition. In preferred approaches, one or more (meth)acrylic binders or styrene-acrylic binders are included in the coating compositions.

Opacifying Pigment or Additional Inorganic Extender Particles

Aqueous coating compositions of the present disclosure may in some embodiments also include optional opacifying pigments or additional inorganic extender particles. If included, suitable pigment particles or inorganic particles used in the coating compositions of the present disclosure include titanium dioxide ($TiO_2$), calcium carbonate ($CaCO_3$), talc, clay materials, aluminum oxide, silicon dioxide, magnesium oxide, zinc sulfate, combinations thereof, or other known pigment or inorganic particles suitable for paints and other coatings. In some approaches, the pigment or inorganic particle is titanium dioxide, which may comprise anatase titanium dioxide or rutile titanium dioxide, or a mixture of the two. In other approaches, the pigment or inorganic particle comprises rutile titanium dioxide, to the exclusion of anatase titanium dioxide. In some approaches, the rutile titanium dioxide is surface treated with an inorganic oxide, such as silica ($SiO_2$). Generally, opacifying pigments, such as titanium dioxide, have a particle size less than a micron, such as about 0.2 to about 0.3 microns in diameter and provided in powder form, or in an aqueous slurry. An example of a titanium dioxide that is suitable for use is Ti-Pure® R-706, which is commercially available from E.I. du Pont de Nemours and Company. Ti-Pure® R-706 titanium dioxide is a rutile titanium dioxide that is surface treated with silica.

In some approaches, the aqueous compositions disclosed herein may include about 10 to about 30 weight percent of titanium dioxide, about 15 to about 20 weight percent, or about 18 to about 25 weight percent of titanium dioxide for extra white formulations based on the total weight of components in the coating composition. In other approaches, the compositions may include about 5 to about 10 weight percent of titanium dioxide for deep formulations or about less than about 5 weight percent for ultra deep formulations.

Coating compositions of the present invention many be formulated to have a range of gloss and sheens. In some approaches, coating compositions of the present invention have a pigment volume concentration (PVC) of about 45 to about 55, which is typical for flat sheens, or about 35 to about 45, which is typical for matte sheens, or about 18 to about 40, which is typical for eggshell and satin sheens, or in an amount of about 10 to about 26 weight percent, which is typical for semi-gloss sheens, or in an amount of about 1 to about 12 weight percent, which is typical for gloss sheens. The PVC may vary depending on the application. For instance, the PVC of architectural exterior coatings may be about 10 to about 50, the PVC of masonry coatings may be about 10 to about 40, the PVC of stains may be about 10 to about 40, and extra while formulations may contains more PVC, such as about 20 to about 45.

In some approaches, the disclosed coating compositions can be formulated to have a flat finish, such that when cured on a substrate and allowed to cure for 10 minutes at room temperature of 30 minutes at 50° C., the coating composition of the present disclosure has a 60 Gloss of less than about 10 or an 85 Sheen of less than 10. If a matte finish is desired, the disclosed coating composition may be formulated such that when cured on a substrate and allowed to cure for 10 minutes at room temperature of 30 minutes at 50° C., the coating composition of the present disclosure has a 60 Gloss of less than about 25 or an 85 Sheen of less than 25. If a semi-gloss finish is desired, the coating composition can be formulated such that when cured on a substrate and allowed to cure for 10 minutes at room temperature of 30 minutes at 50° C., the coating composition of the present disclosure has an 85 Sheen between 25 and 45. Or, if a gloss finish is desired, the disclosed coating compositions can be formulated to have an 86 Gloss of greater than 45. The disclosed extender packages are particularly useful for formulating coating compositions having a flat finish, because such composition conventionally include higher amounts of inorganic mineral extenders to produce a rough surface in order to scatter specular incident light. But these conventional mineral extenders can make the surface susceptible to scratching or marring due to the highly irregular shape of these extenders.

If needed for a particular application, the compositions may include additional inorganic or mineral extender agents such as calcium carbonate, silicates, diatomaceous earth, clay, asbestinin, barytes, silica, mica, and microspheres (glass, ceramic, or polymeric, and can be filled or hollow). However, it is preferred that the coating compositions herein are substantially free of inorganic extenders or matting agents which are not opacifying pigments, other than the first extender particles and second extender particles. In some approaches, the coating compositions, substantially free of inorganic extenders or matting agents generally means about 1 wt % or less, about 0.5 wt % or less, about 0.25 wt % or less, about 0.1 wt % or less, or no intentionally added inorganic extender or matting agents.

Optional Additives

The water-borne coating compositions of the present disclosure may also include other optional additives as needed for typical applications. For instance, the water-borne coating composition of the present disclosure is produced using techniques known to those skilled in the art of manufacturing paint or coatings. In addition to the film-forming binder and the other particles or components discussed herein, the water-borne coating compositions herein may contain conventional additives including, but not limited to one or more of an extender, a wet-state preservative, a rheology modifier (preferably, a hydrophobically modified urethane (HEUR), a hydroethylcellulose (HEC), a hydroxy alkali swellable emulsion (HASE), or combination thereof), a colorant, a mildewcide, a surfactant, a dispersant, a defoamer, a coalescent, a plasticizer, an anti-settling agent, a pH modifier, a UV absorbent, a crosslinker, thickeners, coalescing aids, biocides, anti-foaming agents, freeze-thaw additives, and the like. It should also be appreciated that in addition to the opacifying pigment, small amounts of other pigments or colorants may be used to provide desired coloration or to confer other optical effects. In some approaches, the coating compositions disclosed herein may include a rheology modifier, preferably a hydrophobically modified urethane (HEUR), a hydroethylcellulose (HEC), a hydroxy alkali swellable emulsion (HASE), or combination thereof. In some approaches, the coating compositions disclosed herein may include a crosslinker such acetoacetoxyethyl methacrylate (AAEM) or the combination of diacetone acrylamide (DAAM) and adipic dihydrazide (ADH).

In some approaches, the coating compositions may include 1 wt % or less of alkyl phenol ethoxylates (APEOs), about 0.1 wt % or less, about 0.01 wt % or less, about 0.1 wt % or less, or no intentionally added APEOs, the weight percentages based on the total weight of components of the coating composition.

In approaches or embodiments, the water-based coating compositions herein may further include an antimicrobial agent, which is an additive that provide microbiostatic or microbicidal properties to the coating composition. If included, the compositions may include about 0 to about 2.0 weight percent of an antimicrobial agent, preferably about 0.2 to about 1.5 weight percent of an antimicrobial agent, based on the total weight of the coating composition. In some embodiments, coating compositions of the present disclosure include more than one antimicrobial agents. Suitable antimicrobial agents include, but are not limited to, one or more of methyl 2-benzimidazolecarbamate (BCM), 3-iodo-2-propynyl butyl carbamate (IPBC), zinc pyrithione, sodium pyrithione, carbendazim, chlorothalonil, an isothiazolinone, tetrachloroisophthalonitrile, 1,2-benzisothiazolin-3-one (BIT), sodium omadine, zinc omadine, zinc oxide, tetrahydro-3,5-dimethyl-2H-1; 3,5-thiadiazine-2-thione; 5-hydroxymethoxymethyl-1-AZA-3; 2-n-octyl-4-isothiazolin-3-one; 1-(3-chloroallyl)-3,5,7-triaza-1-azoniaadamantane chloride, octylisothiazolinone, dichlorooctylisothiazolinone, n-butyl-benzisothiazolinone, and the like, or combinations thereof.

In some approaches, the disclosed coating compositions may have a weight per gallon of about 7 (3.18 kg) to about 9 lbs (4.09 kg)/gallon (3.785 L) coating composition.

In general, methods for manufacturing the disclosed coating compositions may include three or more stages, including an optional pre-thin stage (which typically may be omitted when making a stain), a grind stage, a wash stage, and a thindown stage. In the pre-thin stage, one or more film-forming binder resins may be mixed with a carrier liquid in a thindown tank, and low-shear mixing may be applied in the thindown tank to form a pre-thin mixture. In the grind stage, optional pigment particles as well as the disclosed first and second extender particles may be mixed in a high-shear mixing device, such as mill, with carrier liquid, to prepare a grind paste. The high shear applied in the grind stage is intended to break up agglomerates of pigment particles and to disperse the extender particles, and to ensure the pigment particles are wetted with the resin. In the wash stage, a carrier liquid in connection with the pigment dispersion resin may be pumped into the high-shear mixing device to move the grind paste into a thindown tank. In a thindown stage, the grind paste, the same or another carrier liquid, and the wash liquid are blended together in the thindown tank under low shear conditions. These components also may be blended together with the pre-thin mixture in the thindown tank. The coating composition concentrate may be further let down through further addition of liquid including any one or more of the carrier liquids herein. The disclosed method of manufacturing a coating composition may employ these conventional stages, or may employ other suitable methods, such as continuous manufacturing using component slurries.

Once prepared, the disclosed coating composition may be dispensed into a storage container, such as a can or bucket. When the storage container is opened, the coating composition may be applied onto a substrate, such as comprising drywall, wood, vinyl, metal, cementitious fibreboard, or combinations thereof. Any tool suitable for applying a coating composition, such as a brush, roller, sponge, or spray gun, may be used to apply the composition. Upon application, liquid within the composition will evaporate, and the binder resin of the coating composition will coalesce to form a film that upon drying or curing will yield the desired coating.

Glossary of Terms

A "latex" polymer means a dispersion or emulsion of polymer particles formed in the presence of water and one or more dispersing or emulsifying agents (e.g., a surfactant, alkali-soluble polymer, or mixtures thereof) whose presence is required to form the dispersion or emulsion. The dispersing or emulsifying agent is typically separate from the polymer after polymer formation. In some examples, a reactive dispersing or emulsifying agent may become part of the polymer particles as they are formed.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, an aqueous coating composition that contains "an" additive means that the aqueous coating composition includes "one or more" additives.

The term "comprises" and variations thereof do not have a limiting meaning where these terms appear in the description and claims.

The term "on" when used in the context of a coating applied on or to a surface or substrate includes both coatings applied directly to the surface or substrate, as well as coatings applied indirectly to the surface or substrate, such as when a interstitial layer such as a primer or treatment is present between the substrate and the coating.

The phrase "low VOC" when used with respect to a liquid coating composition means that the liquid coating composition contains less than about 250 grams volatile organic compounds per liter composition, excluding water and exempt compounds. The term "very low VOC" means a liquid coating composition that contains less than 150 grams volatile organic compounds per liter of composition, excluding water and exempt compounds. The term "extremely low VOC" means a liquid coating composition that contains less than 50 grams volatile organic compounds per liter of composition, excluding water and exempt compounds. The term "no VOC" means a liquid coating composition that contains less than 5 grams VOCs per liter of composition.

The term "(meth)acrylic acid" includes either or both of acrylic acid and methacrylic acid, and the term "(meth)acrylate" includes either or both of an acrylate and a methacrylate.

The term "about" means that the value may vary in an amount understood by a person of ordinary skill in the art to account for variability in measurement techniques, variations in material content around target values, and ordinary variations in manufacturing around a target.

The term "additive" refers to a general category of components or other raw materials that may be added to the coatings herein to promote various properties. Examples include, but are not limited to, surfactants, defoamers, biocides, mildewcides, algaecides, thickeners, anti-settling agents, pH buffers, corrosion inhibitors, driers, and/or anti-skinning agents.

As used herein, without the need for, without substantial levels of, in the absence of, or substantially free of, substantially none, substantially no, or free-of generally means (unless apparent from the context of the discussion) the coating compositions herein have less than about 1 weight percent, in other approaches, less than about 0.5 weight percent, in other approaches, less than about 0.2 weight percent, and in yet other approaches, none of the particular component or additive. As used herein, essentially free of means no intentionally added amount of an identified material.

When referring to a polymer, oligomer, or copolymer, and a particular monomer or reactant is described, it is also intended that such discussion refers to the resulting monomer unit or associated repeating unit when polymerized within the polymer, oligomer, or copolymer. Likewise, when a monomer unit or repeating unit of a polymer, oligomer, or copolymer is described, the corresponding monomer or reactant is also contemplated by this disclosure. As used herein, the terms polymer or copolymer are interchangeable unless the context of discussion suggests otherwise. A polymer or copolymer typically have a weight average molecular weight above about 40,000 and an oligomer typically has a molecular weight below 500.

The terms (meth)acrylate monomer(s) or monomer unit(s) include both acrylate monomer(s) and monomer unit(s) and methacrylate monomer(s) and monomer unit(s) as well as functionalized (meth)acrylate monomer(s) or monomer unit(s) suitable for incorporation into the functionalized polymers or oligomers disclosed herein. Functional moieties may also bear other crosslinking groups, photo-reactive groups, anti-fouling agents, light absorbers, anti-corrosion agents, and the like as needed for a particular application or use.

The terms functionalized, functionality, or functional group means a group or moiety of a larger molecule or polymer reactive with another group or atom.

Opacity or hiding (in some approaches) generally refers to the ability of a film to scatter light based on the thickness of the film. The Opacity is often expressed as S/mil and may be in the form of Kubelka-Munk scattering coefficients as determined using a modification of ASTM D 2805-70 as described in J. E. Mchutt and H. L. Ramsay in American Paint and Coatings Journal, April 1988, p. 46 by the weight drawdown method, which is incorporated herein by reference.

A "coating" refers to any decorative or protective layer formed by applying a thin film of a coating composition herein to a substrate. Coating compositions include any paint, stain, lacquers, etc. A coating composition may contain a solvent (which can include a volatile component derived from a petroleum distillate for a solvent-based paint, or a low VOC, or no-VOC, or water for a water-based paint or composition), a binder polymer, and optionally, a pigment, fillers (such as an extender or a plurality of extenders of different sizes) and one or more additives, which may impart different functionality to the paint or final coating.

A "paint" refers to a coating composition including pigment and film-forming binder that, when applied to form a thin (e.g., approximately 100 µm) wet thickness coating film on a freshly-sanded smooth wood surface will, when dried, hide or substantially hide the wood grain and will present a new surface with its own appearance.

The terms "Volatile Organic Compounds" and "VOCs" are defined by regulation of the United States Environmental Protection Agency to mean any compound of carbon, excluding carbon monoxide, carbon dioxide, carbonic acid, metallic carbides or carbonates, and ammonium carbonate, which participates in atmospheric photochemical reactions, other than exempt compounds identified in Title 40 Code of Federal Regulations, Sec. 51.100.

Particle size span is a measure of the variance of distribution of particle size about the median particle size. A particle having a narrow particle size distribution will have a lower particle size span. Particle size is measured according to the test method described herein, and particle size span is calculated according to the formula:

$$\text{Particle size span} = \frac{D_{90} - D_{10}}{D_{50}}$$

Pigment volume concentration or PVC refers to a number that represents the volume of pigment and extenders (both inorganic and polymeric extenders) compared to the volume of all solids. In the field of paints and coatings, PVC is a useful measure because the binder (non-pigment) polymer acts as the material to unite all the pigment and other raw materials into the paint and the PVC value ensures there is enough binder to enable the paint or coating to adhere properly to whatever it has been applied over in addition to containing all of the other components of the paint or coating. If a paint or coating has no pigment or extenders at all, it will usually be very glossy and have a PVC of zero. An example is clear gloss paints. Flat paints commonly have a very high pigment loading and have high PVCs (usually in the range from about 55% up to about 80%). Primers and undercoats vary from 30% to about 50% PVC as do semi-gloss, satin, and low sheen paints. Additionally, it is thought that the lower the PVC of a paint is, the better its mechanical properties (such as tensile strength, and consequently, exterior durability) will be, usually because the coating therefore contains more polymeric binder per volume. PVC may be expressed as a percentage. For example, if a coating has a PVC of 30, then 30% of the solids is pigment or extender, and 70% is binder solids on a volume basis.

The term "no intentionally added" with reference to an additive or material in a composition means that the composition as formulated does not include the additive or material except trace amounts from manufacturing or background amounts from the environment, and that any components of the composition themselves do not include the additive or material except trace amounts from manufacturing or background amounts from the environment.

Test Methods

The amount of VOC present in a composition is be measured by gas chromatography via ASTM D6886-18, titled "Standard Test Method for Determination of the Weight Percent of Individual Volatile Organic Compounds in Waterborne Air-Dry Coatings by Gas Chromatography" using methyl palmitate as a market. VOC amounts are reported in grams/Liter less exempt compounds (g/L).

The particle sizes referred to herein may be determined by laser diffraction particle size analysis using a Beckman Coulter LS 230 Laser Diffraction Particle Size Analyzer or equivalent, calibrated as recommended by the manufacturer. Samples for laser diffraction particle size analysis can be prepared, for example, by diluting the samples in a substantially non-swelling solvent (such as cyclohexanone or 2-butoxyethanol) and shaking them until evenly dispersed. The choice of a suitable solvent will depend upon the particular particles to be tested. Solvent screening tests may need to be conducted to identify a suitable substantially non-swelling solvent when assessing particle size of polymeric particles. By way of example, a solvent in which a polymer particle swells by about 1% or less (as determined by laser diffraction particle size analysis) would be considered a substantially non-swelling solvent.

Aspects of a particle size distribution can be characterized by the "D-values" (e.g., D10, . . . . D50, D90, D95, and D99). The D-value represents the number percentage of particles that are below a certain particle size. For example, the median particle size is called the D50 (or ×50 when following certain ISO guidelines), because the D50 is the particle size in microns that splits the distribution with half above and half below this diameter. The D90 describes the particle size where ninety percent of the distribution has a smaller particle size and ten percent has a larger particle size. The D95 describes the particle size where ninety five percent of the distribution has a smaller particle size and five percent has a larger particle size. The D99 describes the particle size where ninety nine percent of the distribution has a smaller particle size and one percent has a larger particle size. The D-values specified herein may be determined by laser diffraction particle size analysis. Particle size span is calculated from the measured or reported particle size, and is defined as (D90–D10)/D50.

Static and Dynamic Coefficient of Friction is measured according to ASTM D1894-14 on a coating composition drawdown generated on release paper using an 8 mil Bird applicator cured for one week at 23° C. and 50% relative humidity, with the mean of five replicates reported.

Rubber mar resistance of a coating was measured on a drawdown made using 4 mil (0.10 mm) Bird bar, with the coating allowed to cure by air drying for 10 minutes followed by 30 minutes in a 120° F. oven. A black rubber doorstop, black cabinet castor wheel, or a black block resistance rubber stopper is then dragged across a portion of the coating sample at a 45° angle in a straight line Each mark is evaluated visually on a scale of 1 (most mar) to 10

(no/least mar). After marking and initial evaluation, each sample is regraded after wiping with a dry paper towel and wiping with a wet paper towel. The rating scale was from 1-10, with guidepost grades as follows:

| Rating | Description |
|---|---|
| 10 | >90% of area appears white. Coating appears nearly white under marked area. |
| 7 | Approx. 70% of marked area appears white. Coating has slight black mark, but nearly white under marked area. |
| 5 | Approx. 50% of marked area appears white. |
| 3 | Approx. 70% of marked area appears black. |
| 1 | >90% of marked area appears black. Coating has heavy, black, opaque rubber mark. |

Sheen may also sometimes be referred to as gloss. In a coating, a gloss finish indicates that the surface which has a coating applied to it (i.e., is finished) it is shiny or glass-like. The gloss of a surface is described as the reflection of light from the surface that is independent of color. ASTM D523 may be used to measure sheen. The prescribed angle at which light is reflected off the surface may vary, but for the purposes of this disclosure to measure 85 Sheen, is measured at 85° relative to the surface reflecting the light. ASTM D523 may also be used to describe 60 Gloss, which is measured at 60° relative to the surface reflecting the light. Gloss may also refer to the gloss intensity measured at 20, 60, or 85 degrees and is determined according to ASTM D323. Gloss and Sheen measurements are made of coating composition drawdowns made using 4 mil (0.10 mm) Bird bar, which are allowed to cure for 30 minutes at room temperature or 10 minutes at 50° C. followed by a 10 minute cool.

Washability is a measure of the relative ease of removing common soils and stains from a coated surface by manual or mechanical washing. Washability is assessed according to ASTM D4828-94, with at least crayon, black ink pen, pencil, and red lipstick used as stains, and 10 mL Formula 409 as a liquid cleanser with evaluation after 50 cycles.

Blocking resistance is a measure of the undesirable sticking together of two painted surfaces when pressed together or placed in contact with each other for an extended period of time. Blocking resistance as reported herein is measured according to a modified version of ASTM D4946-89 (reapproved 2017). To evaluated blocking resistance within this method, two substrates of painted panels are dried in an environmental chamber at 25° C. 1" squares are cut and placed face to face, and a 1000-g weight on top of a No. 8 stopper is placed on top, resulting in a pressure of 127 g/cm². The samples are evaluated for blocking after 24 hours and 72 hours, with measurements in triplicate. The samples are then separated by peeling apart at a 180° angle. Blocking resistance herein is reported according to a modified scale from 0-5.

| Rating | Description | Performance |
|---|---|---|
| 5 | No tack | Excellent |
| 4 | Slight tack | Good |
| 3 | Tacky, no seal | Poor |
| 2 | 5-25% seal | Fail |
| 1 | 26-50% seal | Fail |
| 0 | >50% seal | Fail |

The term "scrub resistance," as used herein, refers to the ability of the surface of a coating film or paint film to resist being worn away or to maintain its original appearance when rubbed with or against an abrasive surface, typically during cleaning. Scrub resistance is measured according to ASTM D2486-96 (Standard Test Method for Scrub Resistance of Wall Paints). As reported according to the standard test method, a larger number of scrubs indicates greater scrub resistance.

Sheen may also sometimes be referred to as gloss. In a coating, a gloss finish indicates that the surface which has a coating applied to it (i.e., is finished) is shiny or glass-like. The gloss of a surface is described as the reflection of light from the surface that is independent of color. ASTM D523 may be used to measure gloss or sheen. The prescribed angle at which light is reflected off the surface may vary, but for the purposes of this disclosure, 85 Sheen is measured at 85° relative to the surface reflecting the light. ASTM D523 may also be used to evaluate 60 Gloss, which is measured at 60° relative to the surface reflecting the light. Gloss may also refer to the gloss intensity measured at 20, 60, or 85 degrees and is determined according to ASTM D523. One of skill in the art is able to determine relative levels of gloss (low versus high) in context of each coating.

Dry burnish is a measure of the resistance of a coating to increase its gloss or sheen following polishing or rubbing. Dry burnish may be measured according to ASTM D6736-08 (reapproved 2019), in which the gloss or sheen of a coating measured before and after the coating is rubbed with 4-ply cheesecloth on a reciprocating scrub machine. Dry burnish data provided in this disclosure is measured according to ASTM D6736 with the following modifications: the percent increase in 85 Sheen is reported after 5 reciprocating cycles and after 25 reciprocating cycles.

Mohs hardness is the scratch resistance of minerals, ceramics, and other hard materials, characterized by the ability of the material to be scratched by a harder material. The Mohs scale ranges from 1 (talc) to 10 (diamond). To assess Mohs hardness, a sharp edge of a reference material is drawn across the test material, and the test material is examined visually for scratches. If no scratches are present, then the test is repeated with the reference material of the next highest Mohs scale hardness. Mohs hardness can be evaluated by UNE-EN ISO 6769.

Shore D hardness is a measurement of the durometer hardness of polymeric materials. Shore D hardness is assessed according to ASTM D2240-15 (2021).

EXAMPLES

Example 1: Comparative Testing of Coating Compositions

Coating compositions configured for architectural paint applications were evaluated for various performance features including rubber mar resistance, gloss/sheen, washability, rubber mar resistance, scrubs, blocking, and dry burnish. The coating composition included a styrene-acrylic latex as a film forming binder, 1.6% of a polysiloxane dispersion in water (64% solids in water), and the extenders shown in Table 1.

TABLE 1

Example 1 Coating Composition Components

| Component | Amt. (Lb/100 gallons coating composition) |
|---|---|
| Ceramic Microspheres, 6 μm median particle size[1] | 85 |
| Ceramic Microspheres, 9 μm median particle size[2] | 60 |
| Poly vinyl chloride homopolymer bead, 22.5 μm median particle size[3] | 20 |

[1] Alkali alumino silicate ceramic microspheres, Mohs hardness = 6, particle size span = 1.67
[2] Alkali alumino silicate ceramic microspheres, Mohs hardness = 6, particle size span = 2.1
[3] Shore D hardness = 75, Particle size span = 1.2

The coating composition of Table 1 was compared to two available controls, each marketed as a matte sheen, white base paint with high scuff resistance. Gloss and sheen measurements are shown in Table 2.

|  | Example 1 | Sherwin-Williams Scuff-Tuff Matte Extra White | Benjamin-Moore Scuff-X Matte, Base 1 |
|---|---|---|---|
| 60 Gloss | 6.5 | 8.0 | 10.1 |
| 85 Sheen | 8.9 | 14.6 | 13.3 |

The measurements show that the composition of Example 1 and the control formula Sherwin-Williams Scuff-Tuff Matte Extra White have lower gloss and sheen measurements than the other control. As a general matter, coating compositions having a higher gloss and sheen typically include greater amounts of polymer, which provides improved washability and scrubs performance compared to coatings that are more flat (lower gloss and sheen).

Washability was measured according to ASTM D4828-94. Results are shown in Table 3.

TABLE 3

Washability

| Stain | Example 1 | Sherwin-Williams Scuff-Tuff Matte Extra White[4] | Benjamin-Moore Scuff-X Matte, Base 1 |
|---|---|---|---|
| Coffee | 3 | 4 | 2 |
| Tea | 3 | 4 | 2 |
| Grape Juice | 4 | 4 | 0 |
| Wine | 3 | 4 | 1 |
| Lipstick | 3 | 5 | 4 |
| Crayon | 5 | 4 | 4 |
| Mustard | 3 | 3 | 4 |
| Ketchup | 5 | 5 | 4 |
| Pen | 0 | 0 | 0 |
| Pencil | 3 | 3 | 4 |
| ASTMD3450 mineral-oil borne soilant | 2 | 3 | 4 |
| Average | 3.1 | 3.5 | 2.6 |

The results show slightly improved performance compared to Benjamin-Moore Scuff-X Matte and similar washability to the other control.

Rubber mar resistance was measured according to the method disclosed herein.

TABLE 4

Rubber Mar Resistance[5]

| Rubber Object | Example 1 | Sherwin-Williams Scuff-Tuff Matte Extra White | Benjamin-Moore Scuff-X Matte, Base 1 |
|---|---|---|---|
| Black rubber doorstop | 7, 7, 7 | 3, 3, 3, | 1, 1, 1 |
| Black Cabinet Wheel Castor | 10, 10, 10 | 7, 7, 7, | 3, 3, 3 |
| Black Rubber Stopper | 5, 5, 7 | 3, 3, 3 | 5, 5, 5 |
| Black Hockey Puck | 7, 7, 7 | 1, 1, 1 | 1, 1, 1 |

The data shows that the composition of Example 1 has improved rubber mar resistance compared to both control compositions.

Blocking resistance was performed according to the test described herein.

TABLE 5

Blocking Resistance (Average of Triplicate Measurements)

|  | Example 1 | Sherwin-Williams Scuff-Tuff Matte Extra White | Benjamin-Moore Scuff-X Matte, Base 1 |
|---|---|---|---|
| 24 Hours | 4 | 4 | 2.7 |
| 72 Hours | 4.7 | 5 | 4.7 |
| 7 Day | 4 | 4 | 3 |

The data shows equivalent or better performance compared to other controls.

Scrubs was measured according to the test described herein.

TABLE 6

Scrubs

| Example 1 | Sherwin-Williams Scuff-Tuff Matte Extra White | Benjamin-Moore Scuff-X Matte, Base 1 |
|---|---|---|
| 630 | 635 | 1179 |

The data shows at least equivalent performance compared to other controls

Dry burnish was measured according to the test described herein.

TABLE 7

Dry Burnish

|  | Example 1 | Sherwin-Williams Scuff-Tuff Matte Extra White | Benjamin-Moore Scuff-X Matte, Base 1 |
|---|---|---|---|
| Initial 85 Sheen | 6.5 | 7.8 | 7.2 |
| 85 Sheen After 5 Cycles | 7.0 | 8.4 | 7.8 |
| % Increase After 5 Cycles | 7.7% | 7.7% | 8.3% |
| 85 Sheen After 25 Cycles | 7.5 | 8.8 | 8.1 |
| % Increase After 25 Cycles | 15.4% | 12.8% | 12.5% |

The data shows that after burnishing, a coating formed from the composition of Example 1 maintained lower gloss and sheen than either of the control formulas.

Example 2: Evaluation of Extender Material on Scuff Resistance

An experiment was conducted to evaluate the impact of extender material on scuff resistance, while holding extender size and extender size distribution constant. The extenders shown in Table 8 were added to a paint based on a proprietary all-acrylic latex emulsion blended with a polyurethane dispersion, and conventional defoamers, rheology modifiers, pigments, and biocides. A polysiloxane dispersion was present in water (64% solids) was present in an amount of 0.4% by total weight of the composition.

The coating compositions were prepared by adding one extender package shown in Table 8 during the grind phase. PMMA extenders in Table 2 have a Shore D hardness of at least 90. The sodium alumino silicate ceramic spheres and alkali alumino silicate ceramic spheres have a Mohs scale hardness of 6.

TABLE 8

| | Extender Package Composition in Lb/100 gallons | | | |
|---|---|---|---|---|
| Extender Package | 6 μm PMMA sphere, Cv < 5%[6] | 6 μm alkali alumino silicate ceramic sphere[7] | 5 μm sodium alumino silicate sphere[8] | 20 μm PMMA sphere, Cv < 5% |
| A | 30 | | | 50 |
| B | | | 30 | 50 |
| C | | 30 | | 50 |

[6]Cv is coefficient of variation, and is equal to the 100x the standard deviation of particle size divided by the median particle size.
[7]Particle size span 1.67
[8]Particle size span 2.1

Rubber mar resistance, 60° gloss and 85° sheen were measured on each sample.

TABLE 9

| | Rubber mar resistance, gloss, and sheen. | | | | |
|---|---|---|---|---|---|
| | Rubber Mar (initial, after dry wiping, after wet wiping) | | | | |
| Extender Package | black rubber doorstop | black cabinet castor wheel | block resistance rubber stopper | 60° Gloss | 85° Sheen |
| A | 8, 8, 9 | 8, 9, 10 | 5, 5, 8 | 2.4 | 2.2 |
| B | 8, 8, 9 | 8, 9, 10 | 5, 5, 7 | 2.6 | 2.2 |
| C | 8, 8, 9 | 8, 10, 10 | 4, 4, 6 | 2.4 | 2.1 |

The data shows that, in a fully flat sheen (60° gloss <5), compositions including extender packages, A, B, and C demonstrated nearly identical rubber mar resistance regardless of the material used in the extenders. Without being bound by theory, it is therefore believed that the extender particle size, morphology, and hardness is an important factor in producing improved rubber mar resistance.

Unless otherwise specified, all measurements herein are made at 23±1° C. and 50% relative humidity. The dimensions and values disclosed herein are not to be understood as being strictly limited to the exact numerical values recited. Instead, unless otherwise specified, such as dimension is intended to mean both the recited value and a functionally equivalent range surrounding that value. All ranges noted are intended to mean any endpoint within that range. For example, a dimension disclosed as "40 mm" is intended to mean "about 40 mm".

Illustrative embodiments have been described herein. It will be apparent to those skilled in the art that the above compositions and methods may incorporate changes and modifications without departing from the general scope of this disclosure. It is intended to include all such modifications and alterations within the scope of the present disclosure. Furthermore, to the extent that the term "includes" is used in either the detailed description or the claims, such term is intended to be inclusive in a manner similar to the term "comprising" as "comprising" is interpreted when employed as a transitional word in a claim.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Thus, the numerical parameters disclosed herein can vary around the recited number according to ordinary or expected measurement variation or error, variations or errors in specifications, or manufacturing variation. Moreover, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein.

Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

LIST OF EMBODIMENTS

The following is an exemplary list of preferred embodiments to the present disclosure. While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

Embodiment 1: An aqueous coating composition comprising: a film-forming binder; a water-based carrier liquid; optionally, 30 weight percent or less of at least one opacifying pigment based on the total weight of components of the coating composition; first polymeric or inorganic extender particles lacking sharp edges and points and having an aspect ratio of 1:1 to 3:1, a D50 of about 2 microns to about 8 microns, a particle size span ((D90–D10)/D50)) of less than 2, and a Mohs hardness of at least about 2 or Shore D hardness of at least about 75; second polymeric or inorganic extender particles lacking in sharp edges and points and having an aspect ratio of 1:1 to 3:1, a D50 of about 8 microns to about 30 microns, a particle size span ((D90–D10)/D50)) of less than 2.5, and a Mohs hardness of at least about 2 or a Shore D hardness of at least 75; and a polysiloxane dispersable in water.

Embodiment 2: An extender package suitable for use in a coating composition, the extender package comprising: a blend of (i) first polymeric or inorganic extender particles having a first uniform composition and first uniform cross section and a median particle size of about 2 microns to about 8 microns, a particle size span of less than 2.5, and a Mohs hardness of at least about 2 or a Shore D hardness of at least 75; and (ii) second polymeric or inorganic extender particles having a second uniform composition and second uniform cross section, a particle size span of less than 2.5, and a Mohs hardness of at least about 2 or a Shore D hardness of at least 75.

Embodiment 3: The coating composition or extender package of any one of Embodiments 1 or 2, wherein the first extender particles and the second extender particles have the same composition.

Embodiment 4: The coating composition or extender package of any one of Embodiments 1 to 3, wherein the first extender particles comprise ceramic.

Embodiment 5: The coating composition or extender package of any one of Embodiments 1 to 4, wherein the second extender particles comprise ceramic.

Embodiment 6: The coating composition of Embodiment 1 or the extender package of any one of Embodiments 2 and 3, wherein the first extender particles or the second extender particles, or both, are polymeric.

Embodiment 7: The coating composition or extender package of any one of Embodiments 1 to 6, wherein the film-forming binder comprises a (meth)acrylic latex, a styrene-acrylic latex, a vinyl acetate latex, a urethane modified acrylic latex, or combinations thereof; and/or a polyurethane dispersion.

Embodiment 8: The coating composition or extender package of any one of Embodiments 1 to 7, wherein the first extender particles or the second extender particles comprise poly(meth)acrylate.

Embodiment 9: The coating composition or extender package of any one of Embodiments 1 to 8, wherein the first extender particles or the second extender particles comprise polymethylmethacrylate.

Embodiment 10: The coating composition or extender package of any one of Embodiments 1 to 7, wherein the first extender particles or the second extender particles comprise a polyethylene, a polypropylene, a polyamide, a polyimideamide, a polytetrafluoroethylene, a poly vinyl acetate, a poly vinyl chloride, polystyrene, a butyl styrene polymer, a polyurethane, or a poly vinyl chloride.

Embodiment 10: The coating composition of Embodiment 1 or the extender package of Embodiment 2, wherein the median particle size of the second extender particles is at least 1.3×, at least 1.5×, at least 2×, or at least 3× the median size of the first extender particles.

Embodiment 11: The coating composition or extender package of any one of Embodiments 1 to 10, wherein the first extender particles are about spherical.

Embodiment 12: The aqueous coating composition or extender package of any one of Embodiments 1 to 11, wherein the second extender particles are about spherical.

Embodiment 13: The aqueous coating composition of any one of Embodiments 1 or 3 to 12, wherein the first extender particles are present in the coating composition in an amount of at least about 10 lb (4.54 kg), at least about 20 lb (9.08 kg), at least about 25 lb (11.35 kg), or at least about 60 lb (27.24 kg)/100 gallons (378.5 L) wet coating composition based on the total components of the coating composition.

Embodiment 14: The aqueous coating composition of any one of Embodiments 1 or 3 to 13, wherein the first extender particles are present in the coating composition in an amount of at most 125 lb (567.5 kg), at most 100 (45.4 kg), or at most 75 lb (34.05 kg)/100 gallons (378.5 L) wet coating composition based on the total components of the coating composition.

Embodiment 15: The aqueous coating composition of any one of Embodiments 1 or 3 to 14, wherein the first extender particles are present in the aqueous coating composition in an amount of at least 2, at least 4, at least 6, or at least 8 wt. % based on the total weight of components in the aqueous coating composition.

Embodiment 16: The aqueous coating composition of any one of Embodiments 1 or 3 to 15, wherein the first extender particles are present in the aqueous coating composition in an amount of at most 12, at most 10, or at most 9 wt. % based on the total weight of components in the aqueous coating composition.

Embodiment 17: The aqueous coating composition of any one of Embodiments 1 or 3 to 16, wherein the second extender particles are present in the coating composition in an amount of at least about 5 lb (2.27 kg), at least about 25 (11.35 kg), or at least about 50 lb (22.7 kg)/100 gallons (378.5 L) wet coating composition.

Embodiment 18: The aqueous coating composition of any one of Embodiments or 3 to 17, wherein the second extender particles are present in the coating composition in an amount of at most 120 lb (54.48 kg), at most 100 (45.4 kg), or at most 75 lb (34.05 kg)/100 gallons (378.5 L) wet coating composition.

Embodiment 19: The aqueous coating composition of any one of Embodiments 1 or 3 to 18, wherein the second extender particles are present in the aqueous coating composition in an amount of at least about 0.25, 1.0, 2, 5, or 8 wt. % based on the total weight of components in the coating composition.

Embodiment 20: The aqueous coating composition of any one of Embodiments 1 or 3 to 19, wherein the second extender particles are present in the aqueous coating composition in an amount of at most about 10, 8, or 6 wt. % based on the total weight of components in the coating composition.

Embodiment 21: The coating composition or extender package of any of Embodiments 1 to 20, wherein the weight ratio of the first ceramic particles to the second ceramic particles is at least about 1 to 1, at least about 3 to 1, at least about 5 to 1, or at least about 7 to 1.

Embodiment 22: The coating composition or extender package of any one of Embodiments 1 to 22, wherein the first extender particles or the second extender particles or both have a Mohs scale hardness of at least about 5.

Embodiment 23: The coating composition of any one of Embodiments 1 or 3 to 22, wherein the polysiloxane is present in the aqueous coating composition in an amount of at least about 0.5 lb (0.227 kg), at least about 1 lb (0.454 kg), at least about 5 lb (2.27 kg), at least about 10 lb (4.54 kg), or at least about 15 lb (6.81 kg) per 100 gallons (378.5 L) of coating composition.

Embodiment 24: The coating composition of any one of Embodiments 1 or 3 to 23, wherein the polysiloxane dispersion is present in the aqueous coating composition in an amount of at most about 25 lb (11.35 kg), or at most about 20 lb (9.08 kg) per 100 gallons (378.5 L) of coating composition.

Embodiment 25: The coating composition or extender package of any one of Embodiments 1 to 24, wherein the first particles are an aluminosilicate.

Embodiment 26: The coating composition or extender package of any one of Embodiments 1 to 25, wherein the second particles are an aluminosilicate.

Embodiment 27: The coating composition or extender package of any one of Embodiments 1 to 26, wherein the first extender particles and the second extender particles include no intentionally added crystalline silica.

Embodiment 28: The coating composition of any one of Embodiments 1 or 3 to 27, wherein when applied to a substrate by drawdown with a 4 mil (0.10 mm) Bird bar and allowed to cure for about 10 minutes at room temperature then 30 minutes at 50° C., the cured coating has an 85° sheen of less than 45, and preferably between 25 and 45, as measured by ASTM D523.

Embodiment 29: The coating composition of any one of Embodiments 1 or 3 to 28, wherein when applied to a substrate by drawdown with a 4 mil (0.10 mm) Bird bar and allowed to cure for about 10 minutes at room temperature then 30 minutes at 50° C., the cured coating has an 85 Sheen of less than about 25 as measured by ASTM D523.

Embodiment 30: The coating composition of any one of Embodiments 1 or 3 to 28, wherein when applied to a substrate by drawdown with a 4 mil (0.10 mm) Bird bar and allowed to cure for about 10 minutes at room temperature then 30 minutes at 50° C., the cured coating has a 60 Gloss of less than about 10 or an 85 Sheen of less than about 10 as measured by ASTM D523.

Embodiment 31: The coating composition of any one of Embodiments 1 or 3 to 29, wherein when applied to a substrate by drawdown with a 4 mil (0.10 mm) Bird bar and allowed to cure for about 10 minutes at room temperature then 30 minutes at 50° C., the cured coating has a 60° gloss of less than about 5 and an 85° sheen of less than about 5 as measured by ASTM D523.

Embodiment 32: The coating composition of any one of Embodiments 1 or 3 to 27, wherein when applied to a substrate by drawdown with a 4 mil (0.10 mm) Bird bar and allowed for about 10 minutes at room temperature then 30 minutes at 50° C., the cured coating has an 85° gloss of greater than 45 as measured by ASTM D523.

Embodiment 33: The coating composition of any one of Embodiments 1 or 3 to 32, wherein the film-forming binder includes a (meth)acrylic latex, a styrene-acrylic latex, a urethane modified acrylic latex, or combinations thereof.

Embodiment 34: The aqueous coating composition of any one of Embodiments 1 or 3 to 33, wherein the film-forming binder includes a polyurethane dispersion.

Embodiment 35: The aqueous coating composition of any one of Embodiments 1 or 3 to 34, wherein the polymeric binder includes interpolymerized monomer units of acetoacetoxyethyl (meth)acrylate.

Embodiment 36: The aqueous coating composition of any one of Embodiments 1 or 3 to 35, wherein the polymeric binder includes interpolymerized monomer units of diacetone (meth)acrylamide.

Embodiment 37: The aqueous coating composition of any one of Embodiments 1 or 3 to 36, wherein the polymeric binder includes interpolymerized monomer units of one or more ureido monomers, amino monomers, sulfonate monomers, silane monomers, phosphate monomers, carboxyl monomers, vinyl monomers, or combinations thereof.

Embodiment 38: The aqueous coating composition of any one of Embodiments 1 or 3 to 37, wherein the opacifying pigment comprises titanium dioxide.

Embodiment 39: The aqueous coating composition of any one of Embodiments 1 or 3 to 38, wherein the opacifying pigment is present in the coating composition in an amount of about 10 to about 30 weight percent, or in an amount of about 5 to about 10, or in an amount of less than about 5 weight percent.

Embodiment 40: The aqueous coating composition of any one of Embodiments 1 or 3 to 39, wherein a pigment volume concentration (PVC) of the coating composition is between about 45 to about 55, or in an amount of about 35 to about 45, or in an amount of about 18 to about 40, or in an amount of about 10 to about 26 weight percent, or in an amount of about 1 to about 12 weight percent.

Embodiment 41: The aqueous coating composition of any one of Embodiments 1 or 3 to 40, wherein the film-forming binder is present in the coating composition in at least 150 lb (68.1 kg) polymer solids per 100 gallons coating composition (378.5 L) to at most 275 lbs (124.85 kg) polymer solids per 100 gallons (378.5 L) coating composition.

Embodiment 42: The aqueous coating composition of any one of Embodiments 1 or 3 to 41, wherein the coating composition has a weight per gallon of about 7 (3.2) to about 9 lbs (4.1 kg)/gallon (0.378 L).

Embodiment 43: The aqueous coating composition of any one of Embodiments 1 to 42, wherein the coating composition includes a rheology modifier, preferably one of a hydrophobically modified urethane (HEUR), a hydroethyl-cellulose (HEC), a hydroxy alkali swellable emulsion (HASE), or combination thereof.

Embodiment 44: The aqueous coating composition or extender package of any one of Embodiments 1 to 43, wherein the composition or package further comprising a surfactant.

Embodiment 45: The aqueous coating composition of any one of Embodiments 1 or 3 to 44, wherein the coating composition includes 1 wt. % or less of alkyl phenol ethoxylates (APEOs), 0.1 wt % or less of APEOs, 0.01 wt. % of less of APEOs based on the total weight of components of the coating composition, or no intentionally added APEOs.

Embodiment 46: The aqueous coating composition of any one of Embodiments 1 or 3 to 45, wherein the coating composition has less than about 250 g/L VOC, preferably less than about 150 g/L VOC, more preferably less than about 50 g/L VOC, more preferably less than about 5 g/L VOC, and even more preferably less than about 10 g/L VOC, or most preferably, essentially free of VOCs.

Embodiment 47: The aqueous coating composition or extender package of any one of Embodiments 1 to 46, wherein the coefficient of variation (CV) of the first extender particles or the second extender particles, or both, is about 40 percent or less, about 30 percent or less, about 20 percent or less, about 15 percent or less, about 10 percent or less, or about 5 percent or less.

Embodiment 48: A coated substrate comprising the coating composition of any one of Embodiments 1 to 47 applied directly or indirectly to a substrate comprising drywall, wood, vinyl, metal, cementitious fibreboard, or combinations thereof.

What is claimed is:

1. An aqueous coating composition comprising:
   a film-forming binder;
   a water-based carrier liquid;
   optionally, 30 weight percent or less of at least one opacifying pigment based on the total weight of components of the coating composition;
   first round polymeric or inorganic extender particles lacking sharp edges and points and having an aspect ratio of 1:1 to 3:1, a $D_{50}$ of 2 microns to 8 microns and a particle size span $((D_{90}-D_{10})/D_{50})$ of less than 2 as measured by laser diffraction particle size analysis, and, if inorganic, a Mohs hardness of at least 2 and, if polymeric, a Shore D hardness of at least 75;
   second round polymeric or inorganic extender particles lacking in sharp edges and points, having an aspect ratio of 1:1 to 3:1, a $D_{50}$ of 8 microns to 30 microns, and a particle size span $((D_{90}-D_{10})/D_{50})$ of less than 2.5, wherein as measured by laser diffraction particle size analysis, and, if inorganic, a Mohs hardness of at least 2 and, if polymeric, a Shore D hardness of at least 75; and
   a polysiloxane dispersable in water.

2. The coating composition of claim 1, wherein the film-forming binder comprises a (meth)acrylic latex, a styrene-acrylic latex, a vinyl acetate latex, a urethane modified acrylic latex, or combinations thereof; and/or a polyurethane dispersion.

3. The coating composition of claim 1, wherein the opacifying pigment is present and comprises titanium dioxide.

4. The coating composition of claim 1, wherein the polysiloxane dispersible in water is selected from polydimethylsiloxane (PDMS) emulsions and/or polydiethylsiloxane (PDES) emulsions.

5. The coating composition of claim 1, wherein the first extender particles have the same composition as the second extender particles.

6. The coating composition of claim 1, wherein the first extender particles, the second extender particles, or both comprise ceramic.

7. The coating composition of claim 1, wherein the first extender particles, the second extender particles, or both include an aluminosilicate.

8. The coating composition of claim 1, wherein the $D_{50}$ of the second extender particles is at least 1.3× the $D_{50}$ of the first extender particles when measured laser diffraction particle size analysis.

9. The coating composition of claim 1, wherein the first extender particles, the second extender particles, or preferably both, are essentially spherical.

10. The coating composition of claim 1, wherein the carrier is at least 50 wt. % water, based on the weight of the carrier, and wherein the carrier optionally further includes a solvent selected from aliphatic, cycloaliphatic and aromatic hydrocarbons such as white spirit, cyclohexane, toluene, xylene and naphtha solvents, esters such as methoxypropyl acetate, n-butyl acetate and 2-ethoxyethyl acetate, or octamethyltrisiloxane, and mixtures thereof.

11. The coating composition of claim 1, wherein the first extender particles are present in the coating composition in an amount of at least 10 lb/100 gallons (4.54 kg/378.5 liters) wet coating composition based on the total components of the coating composition.

12. The coating composition of claim 1, wherein the first extender particles are present in the coating composition in an amount of at most 125 lb/100 gallons (56.70 kg/378.5 liters) wet coating composition based on the total components of the coating composition.

13. The coating composition of claim 1, wherein the second extender particles are present in the coating composition in an amount of at least 5 lb/100 gallons (5.43 kg/378.5 liters) wet coating composition.

14. The coating composition of claim 1, wherein the second extender particles are present in the coating composition in an amount of at most 120 lb/100 gallons wet coating composition.

15. The composition of claim 1, wherein the polysiloxane is present in the aqueous coating composition in an amount of at least 0.5 lb per 100 (0.23 kg per 178.5 liters) gallons of coating composition.

16. The coating composition of claim 1, wherein the polysiloxane is present in the aqueous coating composition in an amount of at most 25 lb per 100 gallons (11.34 kg per 178.5 liters) of coating composition.

17. The coating composition of claim 1, wherein when applied to a substrate by drawdown with a 4 mil (0.10 mm) Bird bar and allowed to cure for about 10 minutes at room temperature then 30 minutes at 50° C., the cured coating has an 85° sheen of between 25 and 45 as measured by ASTM D523.

18. The coating composition of claim 1, wherein when applied to a substrate by drawdown with a 4 mil (0.10 mm) Bird bar and allowed to cure for about 10 minutes at room temperature then 30 minutes at 50° C., the cured coating has an 85 Sheen of less than about 25 as measured by ASTM D523.

19. The coating composition of claim 18, wherein when applied to a substrate by drawdown with a 4 mil (0.10 mm) Bird bar and allowed to cure for about 10 minutes at room temperature then 30 minutes at 50° C., the cured coating has a 60 Gloss of less than about 10 or an 85 Sheen of less than about 10 as measured by ASTM D523.

20. The coating composition of claim 19, wherein when applied to a substrate by drawdown with a 4 mil (0.10 mm) Bird bar and allowed to cure for about 10 minutes at room temperature then 30 minutes at 50° C., the cured coating has a 60° gloss of less than about 5 and an 85° sheen of less than about 5 as measured by ASTM D523.

21. The coating composition of claim 1, wherein when applied to a substrate by drawdown with a 4 mil (0.10 mm) Bird bar and allowed for about 10 minutes at room temperature then 30 minutes at 50° C., the cured coating has an 85° gloss of greater than 45 as measured by ASTM D523.

\* \* \* \* \*